(12) United States Patent
Yoda et al.

(10) Patent No.: US 10,308,824 B2
(45) Date of Patent: Jun. 4, 2019

(54) RADIATION CURABLE INK JET COMPOSITION AND INK JET RECORDING METHOD

(71) Applicant: Seiko Epson Corporation, Tokyo (JP)

(72) Inventors: Toshiyuki Yoda, Matsumoto (JP); Keitaro Nakano, Matsumoto (JP); Hitoshi Tsuchiya, Chino (JP)

(73) Assignee: Seiko Epson Corporation (JP)

( * ) Notice: Subject to any disclaimer, the term of this patent is extended or adjusted under 35 U.S.C. 154(b) by 180 days.

(21) Appl. No.: 15/426,363

(22) Filed: Feb. 7, 2017

(65) Prior Publication Data

US 2017/0233594 A1     Aug. 17, 2017

(30) Foreign Application Priority Data

Feb. 12, 2016 (JP) ................... 2016-024423

(51) Int. Cl.
   *B41M 5/00*     (2006.01)
   *B41J 11/00*    (2006.01)
   *C09D 11/101*   (2014.01)
   *C09D 11/30*    (2014.01)
   *C09D 11/326*   (2014.01)

(52) U.S. Cl.
   CPC .......... *C09D 11/101* (2013.01); *B41J 11/002* (2013.01); *B41M 5/0023* (2013.01); *C09D 11/30* (2013.01); *C09D 11/326* (2013.01)

(58) Field of Classification Search
   CPC ..... C09D 11/101; C09D 11/30; C09D 11/326; B41M 5/0023; B41J 11/002
   See application file for complete search history.

(56) References Cited

U.S. PATENT DOCUMENTS

| 8,501,830 B2 | 8/2013 | Selman et al. | |
| 2013/0010039 A1* | 1/2013 | Kida | C09D 11/101 347/100 |
| 2013/0295342 A1* | 11/2013 | Araki | C09D 11/101 428/195.1 |

FOREIGN PATENT DOCUMENTS

| JP | 2007-321034 A | 12/2007 |
| JP | 2015-014009 A | 1/2015 |

* cited by examiner

*Primary Examiner* — Henok D Legesse
(74) *Attorney, Agent, or Firm* — Harness, Dickey & Pierce, P.L.C.

(57) ABSTRACT

There is provided a radiation curable ink jet composition including: a monomer A that has one of a (meth)acryloyloxy group and a (meth)acryloyl group and has a cyclic structure containing one or more nitrogen atoms and one or more oxygen atoms in addition to the (meth)acryloyloxy group and the (meth)acryloyl group; and a monofunctional monomer B other than the monomer A; in which the content of the monomer A is equal to or less than 25% by mass with respect to the total mass of the composition, and in which mol average Tg of the monomer A and the monofunctional monomer B is equal to or greater than 45° C.

19 Claims, No Drawings

RADIATION CURABLE INK JET COMPOSITION AND INK JET RECORDING METHOD

BACKGROUND

1. Technical Field

The present invention relates to a radiation curable ink jet composition and an ink jet recording method using the composition.

2. Related Art

In recent years, a radiation curable ink jet composition that is cured by being irradiated with radiation has been used in an ink jet recording method for the purpose of forming an image with high waterproofness, high solvent resistance, high scratch resistance, and the like on a surface of a recording medium. Typically, the radiation curable ink jet composition is configured of a polymerizable compound such as a monofunctional monomer or a polyfunctional monomer and an organic material such as a photopolymerization initiator. Therefore, one of important issues of the radiation curable ink jet composition is to reduce odor of printed, cured, and dried image.

For example, JP-A-2007-321034 discloses an ultraviolet curable process color jet ink that exhibits an excellent curing property and excellent adhesiveness to the recording medium and generates less odor from the printed image by a combination of various photopolymerization initiators with low volatility that generate less odor from the printed image after curing and drying.

JP-A-2015-14009 discloses an ink jet ink that generates less odor in a printing stage and during use by an end user without degrading flexibility by containing at least 50% by weight of trimethylolpropane formal acrylate (CTFA) such that the content of high Tg monomer is less than 5% by weight.

However, the ultraviolet curable process color jet ink disclosed in JP-A-2007-321034 cannot reduce odor of the ink itself though it is possible to reduce the odor of the printed image. Therefore, there is a concern of unpleasant odor filled during printing and health hazard of an operator or the like. In contrast, the ink jet ink disclosed in JP-A-2015-14009 cannot secure coating film hardness due to insufficient glass transition temperature (Tg) and cannot secure a sufficiently low odor property of the printed image due to appearance of an unreacted monomer or a decomposition product of the initiator from the surface of the coating film.

SUMMARY

An advantage of some aspects of the invention is to provide a radiation curable ink jet composition capable of realizing both a low odor property of the composition itself and a low odor property of a cured film formed by the composition.

The invention can be realized in the following configurations or applications.

APPLICATION EXAMPLE 1

According to an aspect of the invention, there is provided a radiation curable ink jet composition including: a monomer A that has one of a (meth)acryloyloxy group and a (meth)acryloyl group and has a cyclic structure containing one or more nitrogen atoms and one or more oxygen atoms in addition to the (meth)acryloyloxy group and the (meth)acryloyl group; and a monofunctional monomer B other than the monomer A; in which the content of the monomer A is equal to or less than 25% by mass with respect to the total mass of the composition, and in which mol average Tg of the monomer A and the monofunctional monomer B is equal to or greater than 45° C.

According to the radiation curable ink jet composition of Application Example 1, it is possible to reduce odor of the composition itself by raising a standard boiling point of the composition itself. Since surface hardness is sufficiently secured after curing, volatilization of uncured monomer to the air after formation of a coating film is suppressed, and odor of a cured film can also be reduced.

APPLICATION EXAMPLE 2

It is preferable that the radiation curable ink jet composition of Application Example 1 further include an acylphosphine oxide-based photopolymerization initiator as a polymerization initiator.

APPLICATION EXAMPLE 3

It is preferable that in the radiation curable ink jet composition of Application Example 2, the content of the acylphosphine oxide-based photopolymerization initiator be equal to or greater than 1% by mass and equal to or less than 20% by mass with respect to the total mass of the composition.

According to the radiation curable ink jet composition of Application Example 2 or 3, the composition tends to exhibit an excellent curing property and a further excellent curing property by a curing process with a UV-LED, in particular.

APPLICATION EXAMPLE 4

It is preferable that in the radiation curable ink jet composition of any one of Application Examples 1 to 3, the content of the monomer A be equal to or greater than 10% by mass with respect to the total mass of the composition.

According to the radiation curable ink jet composition of Application Example 4, it is possible to obtain an excellent curing property of the composition, to raise the standard boiling point of the composition itself, and to thereby further reduce the odor of the composition.

APPLICATION EXAMPLE 5

It is preferable that in the radiation curable ink jet composition of any one of Application Examples 1 to 4, the content of the monofunctional monomer B be equal to or greater than 45% by mass and equal to or less than 80% by mass with respect to the total mass of the composition.

According to the radiation curable ink jet composition of Application Example 5, it is possible to obtain a satisfactory curing property of the composition.

APPLICATION EXAMPLE 6

It is preferable that in the radiation curable ink jet composition of any one of Application Examples 1 to 5, the total content of the polymerizable compound be equal to or greater than 40% by mass and equal to or less than 95% by mass with respect to the total mass of the composition.

According to the radiation curable ink jet composition of Application Example 6, it is possible to further reduce viscosity and odor and to obtain further excellent solubility and reactivity of the photopolymerization initiator.

APPLICATION EXAMPLE 7

It is preferable that in the radiation curable ink jet composition of any one of Application Examples 1 to 6, the monofunctional monomer B be a monofunctional (meth)acrylate compound.

According to the radiation curable ink jet composition of Application Example 7, it is possible to obtain a satisfactory curing property of the composition.

APPLICATION EXAMPLE 8

It is preferable that in the radiation curable ink jet composition of any one of Application Examples 1 to 7, a monomer that has one of a (meth)acryloyloxy group and a (meth)acryloyl group and has a cyclic structure containing two or more oxygen atoms in addition to the (meth)acryloyloxy group and the (meth)acryloyl group be contained as the monofunctional monomer B.

According to the radiation curable ink jet composition of Application Example 8, it is possible to obtain an excellent curing property of the composition, to raise the standard boiling point of the composition itself, and to thereby further reduce the odor of the composition.

APPLICATION EXAMPLE 9

It is preferable that in the radiation curable ink jet composition of any one of Application Examples 1 to 8, a compound represented by the following Formula (1) be contained as the monofunctional monomer B.

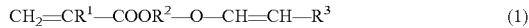

$$CH_2=CR^1-COOR^2-O-CH=CH-R^3 \quad (1)$$

(In the formula, $R^1$ is a hydrogen atom or a methyl group, $R^2$ is a divalent organic residue containing 2 to 20 carbon atoms, and $R^3$ is a hydrogen atom or a monovalent organic residue containing 1 to 11 carbon atoms).

APPLICATION EXAMPLE 10

It is preferable that in the radiation curable ink jet composition of Application Example 9, the content of the compound represented by Formula (1) be equal to or greater than 1% by mass and equal to or less than 30% by mass with respect to the total mass of the composition.

According to the radiation curable ink jet composition of Application Example 9 or 10, it is possible to obtain a further satisfactory curing property of the composition and to suppress an increase in viscosity of the composition. Also, the composition tends to have satisfactory preservation stability.

APPLICATION EXAMPLE 11

It is preferable that the radiation curable ink jet composition of any one of Application Examples 1 to 10 further include a coloring material.

According to the radiation curable ink jet composition of Application Example 11, it is possible to use the composition as a colored ink composition.

APPLICATION EXAMPLE 12

According to another aspect of the invention, there is provided an ink jet recording method including: irradiating the radiation curable ink jet composition according to any one of Application Examples 1 to 11 applied to a recording medium with a UV-LED.

APPLICATION EXAMPLE 13

It is preferable that in the ink jet recording method of Application Example 12, irradiation energy of the UV-LED range from 50 to 1000 mJ/cm$^2$.

APPLICATION EXAMPLE 14

It is preferable that in the ink jet recording method of Application Example 12 or 13, irradiation intensity of the UV-LED range from 10 to 1000 mW/cm$^2$.

APPLICATION EXAMPLE 15

It is preferable that in the ink jet recording method of any one of Application Examples 12 to 14, the temperature of the recording medium at the time of recording be less than 45° C.

According to the ink jet recording method of any one of Application Examples 12 to 15, it is possible to realize the ink jet recording method that reduces odor.

DESCRIPTION OF EXEMPLARY EMBODIMENTS

Hereinafter, description will be given of a preferred embodiment of the invention. The embodiment will be described below for explaining one example of the invention. The invention is not limited to the following embodiment and includes various modification examples performed without departing from the gist of the invention.

In the specification, "(meth)acryloyl" means at least one of acryloyl and methacryloyl corresponding thereto, "(meth)acrylate" means at least one of acrylate and methacrylate corresponding thereto, and "(meth)acryl" means at least one of acryl and methacryl corresponding thereto.

1. Radiation Curable Ink Jet Composition

A radiation curable ink jet composition according to the embodiment (hereinafter, simply referred to as an "ink jet composition" or a "composition") is a composition used by being ejected from an ink jet head based on the ink jet method. Although a radiation curable ink jet ink composition will be described as one embodiment of the radiation curable ink jet composition herein below, the composition may be a composition other than an ink composition, and may be a composition used for 3D formation, for example. Although an "ultraviolet curable" composition will be described as one embodiment of a "radiation curable" composition in some cases, any radiation curable composition is applicable as long as the composition is used by being irradiated with radiation and cured, and "ultraviolet curable" and "ultraviolet curable composition" may be replaced with "radiation curable" and "radiation curable composition". Examples of the radiation include an ultraviolet ray, an infrared ray, a visible light beam, and an x ray. The ultraviolet ray is preferably used as the radiation since radiation sources are easily accessible and have widely been used and materials suitable for curing by irradiation with the ultraviolet ray are easily accessible and have widely been used.

The radiation curable ink jet composition according to the embodiment includes a monomer A that has one of a (meth)acryloyloxy group and a (meth)acryloyl group and has a cyclic structure containing one or more nitrogen atoms and one or more oxygen atoms in addition to the (meth)acryloyloxy group and the (meth)acryloyl group, and a monofunctional monomer B other than the monomer A, the content of the monomer A is equal to or less than 25% by mass with respect to the total mass of the composition, and mol average Tg of the monomer A and the monofunctional monomer B is equal to or greater than 45° C.

"Mol average Tg" in the invention is a value calculated by the following Equation (2) from a value of a glass transition temperature (Tg) when the respective monomers, namely the monomer A and the monofunctional monomer B contained in the composition are homopolymers and rates (mole fractions) of the amounts of substances of the respective monomers with respect to the total amount of substances of the monomer A and the monofunctional monomer B contained in the composition.

$$\text{mol average } Tg = m_1 \times Tg_1 + m_2 \times Tg_2 + \ldots \quad (2)$$

(where $m_1, m_2, \ldots$ represent rates (mole fractions) of the amounts of substances of the respective monomers with respect to the total amount of substances of the monomer A and the monofunctional monomer B contained on the composition. $Tg_1, Tg_2, \ldots$ represent values of glass transition temperatures (Tg) when the respective monomers are homopolymers.)

Surface hardness of the radiation curable ink jet composition according to the embodiment is sufficiently secured even after curing if the mol average Tg of the monomer A and the monofunctional monomer B is equal to or greater than 45° C., preferably equal to or greater than 46° C., further preferably equal to or greater than 48° C., and still further preferably equal to or greater than 50° C., and particularly preferably equal to or greater than 55° C. Therefore, it is possible to suppress volatilization of an uncured monomer to the air and to reduce an odor property of the obtained cured film.

Hereinafter, description will be given of constituents that can be contained in the radiation curable ink jet composition according to the embodiment.

1.1. Polymerizable Compounds
1.1.1. Monomer A

The monomer A is one kind of polymerizable compounds and is a monomer that has one of a (meth)acryloyloxy group and a (meth)acryloyl group and has a cyclic structure containing one or more nitrogen atoms and one or more oxygen atoms other than the (meth)acryloyloxy group and the (meth)acryloyl group.

The composition according to the embodiment contains 25% by mass or less of monomer A with respect to the total mass of the composition. Since the standard boiling point of the composition itself can be raised by the composition according to the embodiment containing the monomer A within the aforementioned range, it is possible to reduce the odor property of the composition itself. Also, since mol average Tg of the monofunctional monomer contained in the composition can be raised, it is possible to obtain an excellent curing property, to reduce volatilization of the monofunctional monomer to the air, and to reduce the odor property of the obtained cured film.

Although the upper limit value of the content of the monomer A in the composition according to the embodiment is equal to or less than 25% by mass with respect to the total mass of the composition, the upper limit is preferably equal to or less than 23% by mass, and more preferably equal to or less than 20% by mass. If the upper limit of the content of the monomer A is within the aforementioned range, it is possible to realize both a low odor property of the composition itself and a low odor property of the cured film formed by the composition. In particular, the cured film exhibits an excellent low odor property. In contrast, the upper limit of the content of the monomer A exceeding the aforementioned range may not be preferable in terms of toxicity to human bodies. The upper limit of the content of the monomer A exceeding the aforementioned range leads to tendency that the curing property deteriorates or tendency that viscosity increases.

The lower limit of the content of the monomer A in the composition according to the embodiment is preferably equal to or greater than 1% by mass, more preferably equal to or greater than 5% by mass, further preferably equal to or greater than 10% by mass, and particularly preferably greater than 10% by mass with respect to the total mass of the composition. If the lower limit of the content of the monomer A falls within the aforementioned range, it is possible to achieve both the low odor property of the composition itself and the low odor property of the cured film formed by the composition. In particular, it is possible to achieve an excellent low odor property of the composition itself.

The monomer A is preferably a compound that has a (meth)acryloyl group, and is more preferably a compound in which the (meth)acryloyl group is directly bonded to a nitrogen atom. At least one of the nitrogen atom and the oxygen atom is preferably contained as an atom that forms a ring, and it is more preferable that the cyclic structure have a heterocyclic structure. Such a compound can more suitably reduce the odor property of the composition itself and the odor property of the cured film.

Specific examples of the monomer A include N-acryloylmorpholine, N-methacryloylmorpholine, 1-acryloylpyrrolidine-2-on, 1-methacryloylpyrrolidine-2-on, 1-acryloylpiperidine-2-on, 1-methacryloylpiperidine-2-on, and derivatives thereof. Among these examples, N-acryloylmorpholine and N-methacryloylmorpholine are preferably used. As the monomer A, one kind may be used alone, or two or more kinds may be used in combination.

1.1.2. Monofunctional Monomer B

The monofunctional monomer B is one kind of the polymerizable compounds and is a monofunctional monomer other than the monomer A. Although the monofunctional monomer B is not particularly limited, a monofunctional monomer that has a polymerizable functional group, in particular, a polymerizable functional group having an unsaturated double bond between carbons can be used. As the monofunctional monomer B, one kind may be used alone, or two or more kinds may be used in combination.

Examples of the monofunctional monomer B include unsaturated carboxylic acids such as a (meth)acrylic acid, an itaconic acid, a crotonic acid, an isocrotonic acid, and a maleic acid; salts of the unsaturated carboxylic acids; ester, urethane, amide, and anhydride of the unsaturated carboxylic acids; acrylonitrile, styrene, and various unsaturated polyesters, unsaturated polyether, unsaturated polyamide, and unsaturated urethane; and N-vinyl compounds such as N-vinylformamide, N-vinylcarbazole, N-vinylacetamide, N-vinylpyrrolidone, and N-vinylcaprolactam.

Among the examples of the monofunctional monomer B, ester of a monofunctional (meth)acrylic acid, that is, monofunctional (meth)acrylate is preferably used in terms of a satisfactory of curing property of the composition.

Examples of functional (meth)acrylate include isoamyl (meth)acrylate, stearyl(meth)acrylate, lauryl (meth)acrylate, octyl (meth)acrylate, decyl (meth)acrylate, isomyristyl (meth)acrylate, isostearyl (meth)acrylate, 2-ethylhexyldiglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, benzyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, dicyclopentenyloxyethyl (meth)acrylate, cyclic trimethylolpropane formal (meth)acrylate, (2-methyl-2-ethyl-1,3-dioxolane-4-yl) methyl (meth)acrylate, and 2-(meth)acrylic acid-1,4-dioxaspiro [4,5] dec-2-ylmethyl.

Among these examples of monofunctional (meth)acrylate, a monomer that has one of a (meth)acryloyloxy group and a (meth)acryloyl group and has a cyclic structure containing two or more oxygen atoms in addition to the (meth)acryloyloxy group and the (meth)acryloyl group, such as trimethylolpropane formal (meth)acrylate, (2-methyl-2-ethyl-1,3-dioxolane-4-yl) methyl (meth)acrylate, 2-(meth)acrylic acid-1,4-dioxaspiro [4,5]dec-2-ylmethyl, (hereinafter, also referred to as "specific cyclic (meth)acrylate") is preferably used in terms of reducing the odor property of the composition itself since it is possible to raise the standard boiling point of the composition itself and to reduce the odor property of the composition itself. Although it is possible to achieve a satisfactory low odor property of the composition itself and a satisfactory low odor property of the cured film formed by the composition by using the monomer A, the content of the monomer A exceeding 25% by mass with respect to the total mass of the composition may not be preferable in terms of the toxicity, the curing property, and the viscosity. In contrast, it is possible to obtain the same satisfactory effects (the low odor property of the composition itself and the low odor property of the cured film formed by the composition) of the use of the monomer A and to obtain these satisfactory properties by containing specific cyclic (meth)acrylate and setting the content of the monomer A to be equal to or less than 25% by mass.

The content of specific cyclic (meth)acrylate is preferably equal to or greater than 10% by mass and equal to or less than 70% by mass, more preferably equal to or greater than 20% by mass and equal to or less than 65% by mass, and particularly preferably equal to or greater than 25% by mass and equal to or less than 60% by mass with respect to the total mass (100% by mass) of the composition. If the content of specific cyclic (meth)acrylate falls within the aforementioned range, it is possible to effectively reduce the odor property of the composition itself.

Among the examples of monofunctional (meth)acrylate, it is preferable to contain monofunctional (meth)acrylate with an aromatic skeleton. Containing monofunctional (meth)acrylate with the aromatic skeleton leads to preferable tendency that solubility of a photopolymerization initiator, which will be described later, becomes satisfactory and the curing property improves. In a case of using an acylphosphine oxide-based photopolymerization initiator or a thioxanthone-based photopolymerization initiator, in particular, the solubility tends to become satisfactory. Among examples of monofunctional (meth)acrylate with the aromatic skeleton, phenoxyethyl (meth)acrylate is further preferably used due to less odor though benzyl (meth)acrylate and phenoxyethyl (meth)acrylate are preferably used.

Examples of monofunctional (meth)acrylate include monofunctional (meth)acrylate containing a vinyl ether group. Although such monofunctional (meth)acrylate is not particularly limited, examples thereof include (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethylpropyl, (meth)acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxyhexyl, (meth)acrylic acid 4-vinyloxymethylcyclohexylmethyl, (meth)acrylic acid 3-vinyloxymethylcyclohexylmethyl, (meth)acrylic acid 2-vinyloxymethylcyclohexylmethyl, (meth)acrylic acid p-vinyloxymethylphenylmethyl, (meth)acrylic acid m-vinyloxymethylphenylmethyl, (meth)acrylic acid o-vinyloxymethylphenylmethyl, (meth)acrylic acid 2-(vinyloxyethoxy) ethyl, (meth)acrylic acid 2-(vinyloxyisopropoxy) ethyl, (meth)acrylic acid 2-(vinyloxyethoxy)propyl, (meth)acrylic acid 2-(vinyloxyethoxy)isopropyl, (meth)acrylic acid 2-(vinyloxyisopropoxy)propyl, (meth)acrylic acid 2-(vinyloxyisopropoxy)isopropyl, (meth)acrylic acid 2-(vinyloxyethoxyethoxy) ethyl, (meth)acrylic acid 2-(vinyloxyethoxyisopropoxy) ethyl, (meth)acrylic acid 2-(vinyloxyisopropoxyethoxy) ethyl, (meth)acrylic acid 2-(vinyloxyisopropoxyisopropoxy) ethyl, (meth)acrylic acid 2-(vinyloxyethoxyethoxy)propyl, (meth)acrylic acid 2-(vinyloxyethoxyisopropoxy)propyl, (meth)acrylic acid 2-(vinyloxyisopropoxyethoxy)propyl, (meth)acrylic acid 2-(vinyloxyisopropoxyisopropoxy)propyl, (meth)acrylic acid 2-(vinyloxyethoxyethoxy)isopropyl, (meth)acrylic acid 2-(vinyloxyethoxyisopropoxy)isopropyl, (meth)acrylic acid 2-(vinyloxyisopropoxyethoxy)isopropyl, (meth)acrylic acid 2-(vinyloxyisopropoxyisopropoxy)isopropyl, (meth)acrylic acid 2-(vinyloxyethoxyethoxyethoxy) ethyl, (meth)acrylic acid 2-(vinyloxyethoxyethoxyethoxyethoxy) ethyl, (meth)acrylic acid 2-(isopropenoxy ethoxy) ethyl, (meth)acrylic acid 2-(isopropenoxy ethoxyethoxy) ethyl, (meth)acrylic acid 2-(isopropenoxy ethoxyethoxyethoxy) ethyl, (meth)acrylic acid 2-(isopropenoxy ethoxyethoxyethoxyethoxy) ethyl, (meth)acrylic acid polyethylene glycol monovinyl ether, and (meth)acrylic acid polypropylene glycol monovinyl ether.

Among the aforementioned examples of monofunctional (meth)acrylate that contains a vinyl ether group, vinyl ether group-containing (meth)acrylate represented by the following Formula (1) is preferably used since it is possible to further reduce the viscosity of the composition, to obtain a high flash point, and to obtain an excellent curing property of the composition.

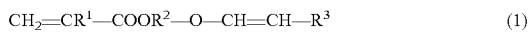

$$CH_2=CR^1-COOR^2-O-CH=CH-R^3 \quad (1)$$

(In the formula, $R^1$ is a hydrogen atom or a methyl group, $R^2$ is a divalent organic residue containing 2 to 20 carbon atoms, and $R^3$ is a hydrogen atom or a monovalent organic residue containing 1 to 11 carbon atoms).

It is possible to obtain an excellent curing property of the composition and to further reduce the viscosity of the composition by the composition according to the embodiment containing vinyl ether group-containing (meth)acrylate represented by the aforementioned Formula (1). Further, it is more preferable to use a compound including a vinyl ether group and a (meth)acryl group in one molecule than separately using a compound including a vinyl ether group and a compound including a (meth)acryl group for a satisfactory curing property of the composition.

As the divalent organic residue containing 2 to 20 carbon atoms, which is represented as $R^2$ in the aforementioned formula (1), a linear, branched, or cyclic alkylene group that contains 2 to 20 carbon atoms and may be substituted, an alkylene group that has an oxygen atom by an ether bond and/or an ester bond in a structure, may be substituted, and contains 2 to 20 carbon atoms, or a divalent aromatic group that has 6 to 11 carbon atoms and may be substituted is preferably used. Among these examples, an alkylene group containing 2 to 6 carbon atoms, such as an ethylene group, an n-propylene group, an isopropylene group, or a butylene group, or an alkylene group that has an oxygen atom by an ether bond in the structure and contains 2 to 9 carbon atoms, such as an oxyethylene group, an oxy n-propylene group, an oxyisopropylene group, or an oxybutylene group is preferably used.

As the monovalent organic residue containing 1 to 11 carbon atoms, which is represented as $R^3$ in the aforementioned Formula (1), a linear, branched, or cyclic alkyl group that contains 1 to 10 carbon atoms and may be substituted or an aromatic group that contains 6 to 11 carbon atoms and may be substituted is preferably used. Among these examples, an alkyl group that is a -methyl-group or an ethyl group and contains 1 or 2 carbon atoms or an aromatic group that contains 6 to 8 carbon atoms, such as a phenyl group or a benzyl group, is preferably used.

In a case where the above respective organic residues are groups that may be substituted, the substituents thereof can be divided into groups that contains carbon atoms and groups that do not contain carbon atoms. First, the substituents are groups that contain carbon atoms, the carbon atoms are counted as the number of carbon atoms in the organic residues. Examples of the groups that contain carbon atoms include a carboxyl group and an alkoxy group though not limited thereto. Next, examples of the groups that do not contain carbon atoms include a hydroxyl group and a halo group though not limited thereto.

The content of the vinyl ether group-containing monofunctional (meth)acrylate, particularly vinyl ether group-containing (meth)acrylate represented by the aforementioned Formula (1) is preferably equal to or greater than 1% by mass and equal to or less than 30% by mass, more preferably equal to or greater than 3% by mass and equal to or less than 25% by mass, and particularly preferably equal to or greater than 5% by mass and equal to or less than 22% by mass with respect to the total mass (100% by mass) of the composition. If the content of the vinyl ether group-containing monofunctional (meth)acrylate is equal to or greater than 1% by mass, it is possible to reduce the viscosity of the composition and to obtain a further excellent curing property of the composition. In contrast, if the content is equal to or less than 30% by mass, it is possible to maintain the preservation stability of the ink in an excellent state.

The content of the monofunctional monomer B is preferably equal to or greater than 45% by mass and equal to or less than 80% by mass, more preferably equal to or greater than 50% by mass and equal to or less than 75% by mass, and particularly preferably equal to or greater than 55% by mass and equal to or less than 70% by mass with respect to the total mass (100% by mass) of the composition in terms of a satisfactory curing property of the composition.

1.1.3. Other Monomers

The composition according to the embodiment may contain a bifunctional or more polyfunctional monomer other than the monomer A and the monofunctional monomer B. As the polyfunctional monomer, polyfunctional (meth)acrylate is preferably used.

Examples of bifunctional (meth)acrylate include diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopenthylglycol di(meth)acrylate, and polytetramethylene glycol di(meth)acrylate.

Examples of trifunctional or more (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

The content of the bifunctional or more (meth)acrylate is preferably equal to or greater than 0.5% by mass and equal to or less than 15% by mass, more preferably equal to or greater than 1% by mass and equal to or less than 10% by mass, and particularly preferably equal to or greater than 2% by mass and equal to or less than 8% by mass with respect to the total mass (100% by mass) of the composition. The content within the aforementioned preferable range leads to tendency that a more excellent curing property, preservation stability, and ejection stability are achieved.

The composition according to the embodiment is preferably a non-water-based composition in which the content of the aforementioned polymerizable compounds is the largest from among medium constituents with solid content of the photopolymerization initiator and the coloring material dissolved or dispersed therein, in terms of the curing property, the preservation stability, and the like. The medium constituents with the largest mass ratios from among the medium constituents contained in the composition are the polymerizable compounds. The content of the polymerizable compounds is preferably equal to or greater than 40% by mass and equal to or less than 95% by mass, more preferably equal to or greater than 50% by mass, further preferably equal to or greater than 60% by mass, and more preferably equal to or less than 90% by mass, and further preferably equal to or less than 80% by mass with respect to the total mass (100% by mass) of the composition. If the content of the polymerizable compounds falls within the aforementioned range, it is possible to further reduce the viscosity and the odor and to obtain further excellent solubility and reactivity of the photopolymerization initiator.

1.2. Photopolymerization Initiator

The composition according to the embodiment preferably contains a photopolymerization initiator. Although the photopolymerization initiator is not particularly limited, examples thereof include known photopolymerization initiators such as an alkylphenone-based photopolymerization initiator, an acylphosphine oxide-based photopolymerization initiator, a titanocene-based photopolymerization initiator, and a thioxanthone-based photopolymerization initiator. From among these examples, the acylphosphine oxide-based photopolymerization initiator is preferably used. The composition tends to exhibit an excellent curing property and in particular, a further excellent curing property by the curing process with the UV-LED by containing the acylphosphine oxide-based polymerization initiator.

Examples of the acylphosphine oxide-based polymerization initiator include 2,4,6-trimethylbenzoyldiphenylphosphine oxide, bis(2,4,6-trimethylbenzoyl)-phenylphosphine oxide, and bis-(2,6-dimethoxybenzoyl)-2,4,4-trimethylpentylphosphine oxide.

Examples of commercially available acylphosphine oxide-based polymerization initiators include IRGACURE 819 (bis(2,4,6-trimethylbenzoyl)-phenylphosphine oxide), IRGACURE 1800 (a mixture of bis-(2,6-dimethoxybenzoyl)-2,4,4-trimethylpentylphosphine oxide and 1-hydroxycyclohexyl-phenylketone at a mass ratio of 25:75), and IRGACURE TPO (2,4,6-trimethylbenzoyldiphenylphosphine oxide) (all of which are manufactured by BASF).

As the photopolymerization initiator, one kind may be used alone, or two or more kinds may be used in combination.

The content of the photopolymerization initiator is preferably equal to or greater than 1% by mass and equal to or less than 20% by mass, more preferably equal to or less than 15% by mass, further preferably equal to or less than 13% by mass, and particularly preferably equal to or less than 10% by mass with respect to the total mass (100% by mass) of the composition for further excellent curing property and ejection stability. Furthermore, the content thereof is further preferably equal to or greater than 3% by mass, and particularly preferably equal to or greater than 5% by mass.

1.3. Other Additives

The composition according to the embodiment may further contain additives such as a coloring material, a dispersant, a polymerization inhibitor, a slip agent, a photosensitizer, and a polymerization inhibitor.

Coloring Material

The composition according to the embodiment may further contain a coloring material. The composition according to the embodiment can be used as a colored ink composition by containing the coloring material. As the coloring material, at least one of a pigment and a dye can be used.

Pigment

It is possible to improve light resistance of the ink composition by using a pigment as the coloring material. Any of an organic pigment and an organic pigment can be used as the pigment.

As the inorganic pigment, carbon black (C.I. pigment black 7) group such as furnace black, lamp black, acetylene black, channel black, iron oxide, or titanium oxide can be used.

Examples of the organic pigment include azo pigments such as an insoluble azo pigment, a condensed azo pigment, azolake, a chelate azo pigment, polycyclic pigments such as a phthalocyanine pigment, a perylene and perinone pigment, an anthraquinone pigment, a quinacridone pigment, a dioxane pigment, a thioindigo pigment, an isoindolinone pigment, and a quinophthalone pigment, dye chelate (such as basic dye-type chelate and acid dye-type chelate), dye lake (basic dye-type lake and acid dye-type lake), a nitro pigment, a nitroso pigment, aniline black, and a daylight fluorescent pigment.

More specifically, examples of carbon black used for a black ink include No. 2300, No. 900, MCF88, No. 33, No. 40, No. 45, No. 52, MA7, MA8, MA100, No. 2200B and the like (all of which are manufactured by Mitsubishi Chemical Corporation), Raven 5750, Raven 5250, Raven 5000, Raven 3500, Raven 1255, Raven 700 and the like (all of which are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (all of which are manufactured by Degussa).

Examples of a pigment used for a white ink include C.I. pigment white 6, 18, and 21.

Examples of pigments used for a yellow ink include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of a pigment used for a magenta ink include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. pigment violet 19, 23, 32, 33, 36, 38, 43, and 50.

Examples of a pigment used for a cyan ink include C.I. pigment blue 1, 2, 3, 15, 15:1, 15:2, 15:3, 15:34, 15:4, 16, 18, 22, 25, 60, 65, and 66 and C.I. vat blue 4 and 60.

Examples of pigments other than magenta, cyan, and yellow include C.I. pigment green 7 and 10, C.I. pigment brown 3, 5, 25, and 26, C.I. pigment orange 1, 2, 5, 7, 13, 14, 15, 16, 24, 34, 36, 38, 40, 43, and 63.

As the pigment, one kind may be used alone, or two or more kinds may be used together.

In a case of using the aforementioned pigment, the average particle size thereof is preferably equal to or less than 300 nm and more preferably from 50 to 200 nm. If the average particle size falls within the aforementioned range, it is possible to obtain further excellent reliability such as ejection stability and dispersion stability in the ink composition and to form an image with high quality. Here, the average particle size described herein is measured by a dynamic light scattering method.

Dye

A dye can be used as the coloring material. The dye is not particularly limited, and an acid dye, a direct dye, a reactive dye, or a basic dye can be used. Examples of the dye include C.I. acid yellow 17, 23, 42, 44, 79, and 142, C.I. acid red 52, 80, 82, 249, 254, and 289, C.I. acid blue 9, 45, and 249, C.I. acid black 1, 2, 24, and 94, C.I. food black 1, and 2, C.I. direct yellow 1, 12, 24, 33, 50, 55, 58, 86, 132, 142, 144, and 173, C.I. direct red 1, 4, 9, 80, 81, 225, and 227, C.I. direct blue 1, 2, 15, 71, 86, 87, 98, 165, 199, and 202, C.I. direct black 19, 38, 51, 71, 154, 168, 171, and 195, C.I. reactive red 14, 32, 55, 79, and 249, and C.I. reactive black 3, 4, and 35.

As the dye, one kind may be used alone, or two or more kinds may be used together.

The content of the coloring material is preferably equal to or greater than 1% by mass and equal to or less than 20% by mass with respect to the total mass (100% by mass) of the ink composition. A clear composition (clear ink) that does not contain the coloring material or contains the coloring material to such an extent that coloring is not intended (equal to or less than 0.1% by mass, for example) may be formed.

Dispersant

In a case where the ink composition contains the pigment, the composition may further contain a dispersant for more satisfactory pigment dispersant. Although the dispersant is not particularly limited, examples thereof include a dispersant that is typically used for preparing a pigment dispersant, such as a polymer dispersant. Specific examples thereof include a dispersant that contains, as main constituents, one or more kinds selected from polyoxyalkylene polyalkylene polyamine, vinyl-based polymer and copolymer, acryl-based polymer and copolymer, polyester, polyamide, polyimide, polyurethane, amino-based polymer, silicon-containing polymer, sulfur-containing polymer, fluorine-containing polymer, and epoxy resin. Examples of a commercially available polymer dispersant include AJISPER Series manufactured by Ajinomoto Fine-Techno Co., Inc., SOLSPERSE Series (such as SOLSPERSE 36000) available from Avecia and Noveon, DISPERBYK Series manufactured by BYK Additives & Instruments, and DISPARLON manufactured by Kusumoto Chemicals, Ltd.

Polymerization Inhibitor

The composition according to the embodiment may further contain a hindered amine compound or other substances as a polymerization inhibitor. Examples of the polymerization inhibitor include p-methoxyphenol, hydroquinone monomethyl ether (MEHQ), hydroquionone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol) though not limited thereto. As the polymerization inhibitor, one kind may be used alone, or two or more kinds may be used in combination.

The content of the polymerization inhibitor is preferably equal to or greater than 0.05% by mass and equal to or less than 0.5% by mass and more preferably equal to or greater than 0.1% by mass and equal to or less than 0.5% by mass with respect to the total mass (100% by mass) of the composition.

Slip Agent

The composition according to the embodiment may further contain a slip agent. As the slip agent, a silicone-based surfactant is preferably used, and polyester-modified silicone or polyether-modified silicone is more preferably used. Examples of polyester-modified silicone include BYK-347, and 348, and BYK-UV3500, 3510, and 3530 (all of which are manufactured by BYK Additives & Instruments), and examples of polyether-modified silicone include BYK-3570 (manufactured by BYK Additives & Instruments). As the slip agent, one kind may be used alone, or two or more kinds may be used in combination.

The content of the slip agent is preferably equal to or greater than 0.01% by mass and equal to or less than 2% by mass and more preferably equal to or greater than 0.05% by mass and equal to or less than 1% by mass with respect to the total mass (100% by mass) of the composition.

Photosensitizer

The composition according to the embodiment may further contain a photosensitizer. Examples of the photosensitizer include amine compounds (such as aliphatic amine, amine including an aromatic group, piperidine, a reactive product of epoxy resin and amine, and triethanolamine triacrylate), urea compounds (such as allylthiourea and o-tolylthiourea), sulfur compounds (such as sodium diethyldithiophosphate and a soluble salt of aromatic sulfinic acid), nitrile-based compounds (such as N,N-diethyl-p-aminobenzonitrile), phosphorus compounds (such as tri-n-butylphosphine and sodium diethyldithiophosphide), nitrogen compounds (such as Michler's ketone, an N-nitrosohydroxylamine derivative, an oxazolidine compound, a tetrahydro-1,3-oxazine compound, condensates of formaldehyde or acetaldehyde and amine), and basic compounds (such as carbon tetrachloride and hexachloroethane).

1.4. Physical Properties

The viscosity of the composition according to the embodiment at 20° C. is preferably equal to or less than 25 mPa·s and preferably from 5 to 20 mPa·s. If the viscosity of the composition at 20° C. falls within the aforementioned range, an appropriate amount of the composition is effected from nozzles, and curved flight and scattering of the composition can be further reduced. Therefore, the composition can be preferably used in an ink jet recording apparatus. The viscosity can be measured by using a viscoelastisity testing machine MCR-300 (manufactured by Pysica), raising a shear rate from 10 to 1000 in an environment at 20° C., and reading the viscosity when the shear rate is 200.

The surface tension of the composition according to the embodiment at 20° C. is preferably equal to or greater than 20 mN/m and equal to or less than 30 mN/m. If the surface tension of the composition at 20° C. falls within the aforementioned range, the composition tends not leak from the nozzles after a liquid repellency treatment. In doing so, an appropriate amount of the composition is ejected from the nozzles, and curved flight and scattering of the composition can be further reduced. Therefore, the composition can be preferably used in an ink jet recording apparatus. The surface tension can be measured by using an automatic surface tension meter CBVP-Z (manufactured by Kyowa Interface Science Co., Ltd.) and checking the surface tension when a platinum plate is wetted with the ink in an environment at 20° C.

1.5. Method of Manufacturing Composition

The composition can be manufactured (prepared) by mixing the respective constituents to be contained in the composition and stirring the constituents such that the constituents are sufficiently uniformly mixed. In the embodiment, a preparation process includes a process of performing at least any of an ultrasonic treatment and a warming treatment on a mixture of the photopolymerization initiator and at least a part of the polymerizable compounds. In doing so, it is possible to reduce the amount of oxygen dissolved in the composition after the preparation and to thereby obtain a composition with excellent ejection stability and preservation stability. The mixture may contain at least the aforementioned constituents, may further contain other constituents to be contained on the composition, or may contain all the constituents to be contained in the composition. The polymerizable compounds contained in the mixture may be at least a part of the polymerizable compounds to be contained in the composition.

2. Ink Jet Recording Method

An ink jet recording method according to the embodiment includes a process of irradiating the aforementioned radiation curable ink jet composition, which has been applied to a recording medium, with a UV-LED (ultraviolet light emitting diode). In doing so, a cured film is formed at a location, to which the composition has been applied, on the recording medium.

Application Process

In the process of applying the composition to the recording medium, a known ink jet recording apparatus can be used. When the composition is ejected, the viscosity of the composition at 20° C. is preferably set to be equal to or less than 25 mPa·s and more preferably from 5 to 20 mPa·s as described above. If the viscosity of the composition falls within the aforementioned range, it is possible to eject the composition at a room temperature or without heating the composition. In contrast, the composition may be ejected after heating the composition to a predetermined temperature to obtain preferable viscosity. In doing so, satisfactory ejection stability can be realized.

Since the radiation curable ink jet composition has higher viscosity than that of a water-based ink composition that is typically used for an ink jet purpose, the viscosity greatly varies due to variations in the temperature at the time of the ejection. Such variations in the viscosity of the composition greatly affect variations in the size of liquid droplets and variations in the liquid droplet ejection speed, and can thus degrade image quality. Therefore, the temperature of the composition at the time of the ejection is preferably maintained to be constant to the maximum extent.

Although not particularly limited, examples of the recording medium include plastics such as polyvinyl chloride, polyethyleneterephthalate, polypropylene, polyethylene, and polycarbonate, and these plastics with treated surfaces, glass, and a coated paper.

Curing Process

Next, the composition that has been applied to the recording medium is cured by irradiation with the UV-LED in a curing process. In other words, the coated film of the composition formed on the recording medium becomes a cured film by the irradiation with the UV-LED. This is because the photopolymerization initiator that can be contained in the composition is decomposed by the irradiation with an ultraviolet ray, initiating species such as radical, acid, and base are generated and a polymerization of the photopolymerization compound is promoted by functions of the initiating species. Otherwise, this is because a photopolymerization reaction of the polymerization compound is started by the irradiation with the ultraviolet ray. If a sensitizing dye is present along with the photopolymerization initiator in the composition at this time, the sensitizing dye in the system absorbs active radiation and is brought into an excited state, decomposition of the photopolymerization initiator is promoted by contact with the photopolymerization initiator, and the curing reaction with higher sensitivity can be achieved.

By using the UV-LED as an ultraviolet source, it is possible to reduce the size and the cost of the apparatus. Since the UV-LED as the ultraviolet source has a small size, the UV-LED can be attached to the inside of the ink jet recording apparatus. For example, the UV-LED can be attached to a carriage (at both ends in a medium width direction and/or on a side of a medium transport direction) on which a print head for ejecting the composition is mounted. Furthermore, it is possible to realize curing at a high speed with low energy due to the aforementioned composition makeup of the composition. The irradiation energy is calculated by multiplying irradiation time by irradiation intensity. Therefore, the irradiation time can be reduced, and a printing speed increases. Also, it is possible to reduce the irradiation intensity. In this manner, it is possible to reduce an increase in a temperature of a printed material, which leads to less odor of the cured film.

The irradiation energy preferably ranges from 50 to 1000 mJ/cm$^2$, more preferably ranges from 100 to 700 mJ/cm$^2$, and particularly preferably ranges from 200 to 600 mJ/cm$^2$ for less odor of the cured film.

The irradiation intensity preferably ranges from 10 to 1000 mW/cm$^2$, more preferably ranges from 30 to 700 mW/cm$^2$, and particularly preferably ranges from 50 to 500 mW/cm$^2$ for less odor of the cured film.

The temperature of the recording medium at the time of the recording is preferably equal to or less than 45° C., more preferably equal to or less than 40° C., and particularly preferably equal to or less than 35° C. If the temperature of the recording medium at the time of the recording falls within the aforementioned range, the temperature of the recording medium is less than mol average Tg of the monofunctional monomer in the aforementioned composition. Therefore, volatilization of the monomer to the air is suppressed after the formation of the coated film, which leads to less odor.

3. Examples

Although the invention will be described more specifically based on examples, the invention is not limited to these examples.

3.1. Preparation of Composition

First, a pigment dispersion in which a coloring material was dispersed in a polymerizable compound was obtained by weighing a coloring material, a dispersant, and a part of polymerizable compounds (VEEA, CTFA in Example 10), putting these constituents to a tank for dispersing a pigment, and stirring the constituents while putting ceramic bead mil with a diameter of 1 mm into the tank. Then, the respective compositions were obtained by putting the rest of the polymerizable compounds, a photopolymerization initiator, a slip agent, and a polymerization inhibitor to a tank for the mixture, which was a stainless steel container, mixing, stirring, and completely dissolving the constituents, pouring the pigment dispersion described above thereto, further mixing and stirring the constituents at an ordinary temperature for 1 hour, and further filtering the constituents with a 5 μm membrane filter so as to obtain the composition described Table 1 or 2.

The used constituents in the table are as follows.

<Polymerizable Compound>

(Monomer A)

ACMO (a name of a product manufactured by KJ Chemicals Corporation, acryloylmorpholine)

(Monofunctional Monomer B)

CTFA ("VISCOAT #200", a name of a product manufactured by Osaka Organic Chemical Industry Ltd., cyclic trimethylolpropane formal acrylate)

MEDOL10 (a name of a product manufactured by Osaka Organic Chemical Industry Ltd., 2-methyl-2-ethyl-1,3-dioxolane-4-yl) methylacrylate CHDOL10 (a name of a product manufactured by Osaka Organic Chemical Industry Ltd., 2-(meth)acrylic acid 1,4-dioxaspiro [4,5]dec-2-ylmethyl)

THFA ("VISCOAT #150", a name of a product manufactured by Osaka Organic Chemical Industry Ltd., tetrahydrofurfuryl acrylate)

CHA ("VISCOAT #155", a name of a product manufactured by Osaka Organic Chemical Industry Ltd., cyclohexyl acrylate)

CD420 (a name of a product manufactured by SARTOMER, 3,3,5-trimethylcyclohexyl acrylate)

VEEA (a name of a product manufactured by Nippon Sholubai Co., Ltd., acrylic acid 2-(2-vinyloxyethoxy) ethyl)

PEA ("VISCOAT #192", a name of a product manufactured by Osaka Organic Chemical Industry Ltd., phenoxyethyl acrylate)

(Polyfunctional Monomer)

DPHA (a name of a product manufactured by Diacel-Allnex Ltd., dipentaerythritol hexaacrylate)

<Photopolymerization Initiator>

IRGACURE 819 (a name of a product manufactured by BASF, bis(2,4,6-trimethylbenzoyl)-phenylphosphine oxide)

TPO ("IRGACURE TPO", a name of a product manufactured by BASF, 2,4,6-trimethylbenzoyldiphenylphosphone oxide)

<Polymerization Inhibitor>
  MEHQ ("p-methoxyphenol", a name of a product manufactured by Kanto Kagaku, hydroquinone monomethylether)
<Slip Agent>
  BYK-UV3500 (a name of a product, manufactured by BYK Additives & Instruments, polyether-modified polydimethylsiloxane containing an acrylic group)
<Coloring Material>
  Carbon black ("MA-100", a name of a product manufactured by Mitsubishi Chemical Corporation)
<Dispersant>
  Solsperse36000 (a name of a product manufactured by Lubrizol, polymer dispersant)

3.2 Creation of Printed Material

An ink jet printer PX-G5000 (manufactured by Seiko Epson Corporation) was used, and the respective nozzle arrays were filled with the compositions obtained as described above. An appropriate amount of each composition to obtain a film thickness of 8 μm (film thickness after curing) was applied to a base material of a PET film ("PET50A PLSIN", a name of a product manufactured by Lintech Corporation) at an ordinary temperature and an ordinary pressure to print a solid pattern thereon, and a UV-LED having a peak wavelength at 395 nm inside an ultraviolet ray irradiation apparatus mounted next to a carriage was used to emit an ultraviolet ray with irradiation intensity of 500 mW/cm². The solid pattern image was completely cured by setting cumulative irradiation energy to be about 1.5 times as high as the energy amount to achieve tack-free state. As described above, a printed material was created by recording the solid pattern image on the PET film.

3.3 Evaluation Method (1) Mol Average Tg of Monofunctional Monomer

Mol average Tg was calculated by the following Equation (2) from a mol average of the blended monofunctional monomer.

$$\text{Mol average } Tg = m_1 \times Tg_1 + m_2 \times Tg_2 + \ldots \quad (2)$$

(In the equation, $m_1, m_2, \ldots$ represent rates (mole fractions) of the amounts of substances of the respective monomers with respect to the total amount of substances of the monomer A and the monofunctional monomer B contained on the composition. $Tg_1, Tg_2, \ldots$ represent values of glass transition temperatures (Tg) when the respective monomers are a homopolymer.)

The glass transition temperature (Tg) when the respective monomers are a homopolymer is a value described as homopolymer Tg (° C.) in Tables 1 and 2.

(2) Evaluation on Odor of Composition

The respective compositions obtained as described above were directly smelled immediately after the preparation, evaluation was performed based on the following evaluation criteria.

(Evaluation Criteria)
AAA: No smell
AA: smell that can be sensed with effort
A: weak smell from which a source of the smell can be recognized
B: Smell that can be easily sensed
C: Strong smell
D: Intense smell (3) Evaluation on Odor of Cured Film The cured film immediately after the curing of the respective printed materials as described above was directly smelled, and evaluation was performed based on the following evaluation criteria.

(Evaluation criteria)
AA: No smell
A: smell that can be sensed with effort
B: weak smell from which a source of the smell can be recognized
C: Smell that can be easily sensed
D: Strong smell
E: Intense smell 3.4. Evaluation Result The following Tables 1 and 2 show composition makeups of the compositions used in examples and comparative examples and evaluation results. The numerical values of the respective constituents in the respective examples and the comparative examples in the tables will be represented in a unit of % by mass.

TABLE 1

| | | Skeleton | Number of O atoms | Number of N atoms | Homopolymer Tg(° C.) | Example 1 | Example 2 | Example 3 | Example 4 | Example 5 | Example 6 | Example 7 |
|---|---|---|---|---|---|---|---|---|---|---|---|---|
| Polymerizable compound | CTFA | Cyclic | 2 | 0 | 27 | 34.2 | | | 24.2 | 24.2 | | 24.2 |
| | MEDOL10 | Cyclic | 2 | 0 | −7 | | 34.2 | | 15 | | 24.2 | 5 |
| | CHDOL10 | Cyclic | 2 | 0 | 22 | | | 34.2 | | 15 | 15 | 15 |
| | ACMO | Cyclic | 1 | 1 | 145 | 25 | 25 | 25 | 20 | 20 | 20 | 15 |
| | THFA | Cyclic | 1 | 0 | −12 | | | | | | | |
| | CHA | Cyclic | 0 | 0 | 15 | | | | | | | |
| | CD420 | Cyclic | 0 | 0 | 29 | | | | | | | |
| | VEEA | | | | 35 | 15 | 15 | 15 | 15 | 15 | 15 | 15 |
| | PEA | | | | −22 | 10 | 10 | 10 | 10 | 10 | 10 | 10 |
| | DPHA | | | | — | 5 | 5 | 5 | 5 | 5 | 5 | 5 |
| Photopolymerization initiator | IRGACURE 819 | | | | — | 4 | 4 | 4 | 4 | 4 | 4 | 4 |
| | TPO | | | | — | 4 | 4 | 4 | 4 | 4 | 4 | 4 |
| Polymerization inhibitor | MEHQ | | | | — | 0.1 | 0.1 | 0.1 | 0.1 | 0.1 | 0.1 | 0.1 |
| Slip agent | BYK-UV3500 | | | | — | 0.5 | 0.5 | 0.5 | 0.5 | 0.5 | 0.5 | 0.5 |
| Coloring material | Carbon black | | | | — | 2 | 2 | 2 | 2 | 2 | 2 | 2 |
| Dispersant | Solsperse36000 | | | | — | 0.2 | 0.2 | 0.2 | 0.2 | 0.2 | 0.2 | 0.2 |
| | Mol average Tg (° C.) of monofunctional monomer | | | | | 66.5 | 55.3 | 66.6 | 53.5 | 58.4 | 50.1 | 48.1 |
| Evaluation item | Evaluation on odor of composition | | | | | A | A | A | AA | AA | AA | AA |
| | Evaluation on odor of cured film | | | | | AA | AA | AA | A | AA | A | A |

TABLE 1-continued

| | | Skeleton | Number of O atoms | Number of N atoms | Homo-polymer Tg(° C.) | Example 8 | Example 9 | Example 10 | Example 11 | Example 12 | Example 13 |
|---|---|---|---|---|---|---|---|---|---|---|---|
| Polymerizable compound | CTFA | Cyclic | 2 | 0 | 27 | 44.2 | | 34.2 | 46.2 | 32.2 | 14.4 |
| | MEDOL10 | Cyclic | 2 | 0 | −7 | | | 25 | | | |
| | CHDOL10 | Cyclic | 2 | 0 | 22 | | 44.2 | | | | 12 |
| | ACMO | Cyclic | 1 | 1 | 145 | 15 | 15 | 25 | 13 | 25 | 16 |
| | THFA | Cyclic | 1 | 0 | −12 | | | | | | |
| | CHA | Cyclic | 0 | 0 | 15 | | | | | | |
| | CD420 | Cyclic | 0 | 0 | 29 | | | | | | |
| | VEEA | | | | 35 | 15 | 15 | | 15 | 15 | 22 |
| | PEA | | | | −22 | 10 | 10 | | 10 | 10 | 20 |
| | DPHA | | | | — | 5 | 5 | 5 | 5 | 5 | 5 |
| Photopolymerization initiator | IRGACURE 819 | | | | — | 4 | 4 | 4 | 4 | 6 | 4 |
| | TPO | | | | — | 4 | 4 | 4 | 4 | 4 | 4 |
| Polymerization inhibitor | MEHQ | | | | — | 0.1 | 0.1 | 0.1 | 0.1 | 0.1 | 0.1 |
| Slip agent | BYK-UV3500 | | | | — | 0.5 | 0.5 | 0.5 | 0.5 | 0.5 | 0.5 |
| Coloring material | Carbon black | | | | — | 2 | 2 | 2 | 2 | 2 | 2 |
| Dispersant | Solsperse36000 | | | | — | 0.2 | 0.2 | 0.2 | 0.2 | 0.2 | 0.2 |
| Mol average Tg (° C.) of monofunctional monomer | | | | | | 50.1 | 49.2 | 62.9 | 46.7 | 67.4 | 46.4 |
| Evaluation item | Evaluation on odor of composition | | | | | AA | AA | A | AA | A | A |
| | Evaluation on odor of cured film | | | | | A | A | AA | A | AA | A |

TABLE 2

| | | Skeleton | Number of O atoms | Number of N atoms | Homopolymer Tg(° C.) | Example 14 | Example 15 | Example 16 | Example 17 | Comparative Example 1 |
|---|---|---|---|---|---|---|---|---|---|---|
| Polymerizable compound | CTFA | Cyclic | 2 | 0 | 27 | 24.2 | | | | |
| | MEDOL10 | Cyclic | 2 | 0 | −7 | | | | | |
| | CHDOL10 | Cyclic | 2 | 0 | 22 | 35 | | | | 49.2 |
| | ACMO | Cyclic | 1 | 1 | 145 | 15 | 25 | 25 | 25 | 10 |
| | THFA | Cyclic | 1 | 0 | −12 | | 34.2 | | | |
| | CHA | Cyclic | 0 | 0 | 15 | | | 34.2 | | |
| | CD420 | Cyclic | 0 | 0 | 29 | | | | 34.2 | |
| | VEEA | | | | 35 | 5 | 15 | 15 | 15 | 15 |
| | PEA | | | | −22 | 5 | 10 | 10 | 10 | 10 |
| | DPHA | | | | — | 5 | 5 | 5 | 5 | 5 |
| Photopolymerization initiator | IRGACURE 819 | | | | — | 4 | 4 | 4 | 4 | 4 |
| | TPO | | | | — | 4 | 4 | 4 | 4 | 4 |
| Polymerization inhibitor | MEHQ | | | | — | 0.1 | 0.1 | 0.1 | 0.1 | 0.1 |
| Slip agent | BYK-UV3500 | | | | — | 0.5 | 0.5 | 0.5 | 0.5 | 0.5 |
| Coloring material | Carbon black | | | | — | 2 | 2 | 2 | 2 | 2 |
| Dispersant | Solsperse36000 | | | | — | 0.2 | 0.2 | 0.2 | 0.2 | 0.2 |
| Mol average Tg (° C.) of monofunctional monomer | | | | | | 51.6 | 46.8 | 57.7 | 67.0 | 39.8 |
| Evaluation item | Evaluation on odor of composition | | | | | AA | B | C | B | AA |
| | Evaluation on odor of cured film | | | | | A | A | AA | AA | C |

| | | Skeleton | Number of O atoms | Number of N atoms | Homopolymer Tg(° C.) | Comparative Example 2 | Comparative Example 3 | Comparative Example 4 | Comparative Example 5 | Comparative Example 6 |
|---|---|---|---|---|---|---|---|---|---|---|
| Polymerizable compound | CTFA | Cyclic | 2 | 0 | 27 | | 49.2 | | | |
| | MEDOL10 | Cyclic | 2 | 0 | −7 | 49.2 | | | | |
| | CHDOL10 | Cyclic | 2 | 0 | 22 | | | | | |
| | ACMO | Cyclic | 1 | 1 | 145 | 10 | 10 | | | |
| | THFA | Cyclic | 1 | 0 | −12 | | | 59.2 | | |
| | CHA | Cyclic | 0 | 0 | 15 | | | | 59.2 | |
| | CD420 | Cyclic | 0 | 0 | 29 | | | | | 59.2 |
| | VEEA | | | | 35 | 15 | 15 | 15 | 15 | 15 |
| | PEA | | | | −22 | 10 | 10 | 10 | 10 | 10 |
| | DPHA | | | | — | 5 | 5 | 5 | 5 | 5 |
| Photopolymerization initiator | IRGACURE 819 | | | | — | 4 | 4 | 4 | 4 | 4 |
| | TPO | | | | — | 4 | 4 | 4 | 4 | 4 |
| Polymerization inhibitor | MEHQ | | | | — | 0.1 | 0.1 | 0.1 | 0.1 | 0.1 |
| Slip agent | BYK-UV3500 | | | | — | 0.5 | 0.5 | 0.5 | 0.5 | 0.5 |
| Coloring material | Carbon black | | | | — | 2 | 2 | 2 | 2 | 2 |
| Dispersant | Solsperse36000 | | | | — | 0.2 | 0.2 | 0.2 | 0.2 | 0.2 |

TABLE 2-continued

| | | | | | | |
|---|---|---|---|---|---|---|
| | Mol average Tg (° C.) of monofunctional monomer | 23.4 | 41.4 | −5.6 | 14.4 | 24.0 |
| | Evaluation on odor of composition | AA | AA | B | D | B |
| Evaluation item | Evaluation on odor of cured film | C | C | C | D | B |

It was confirmed from tables 1 and 2 that the compositions themselves in Examples 1 to 17 according to the embodiment generated less odor surface hardness was sufficiently secured even after the curing, volatilization of the decomposed substances of the uncured monomer and the photopolymerization initiator was suppressed, and the cure film also generated less odor.

The invention is not limited to the aforementioned embodiment, and various modifications can be made. For example, the invention include substantially the same configurations (for example, configurations with the same functions, methods, and results or configurations with the same purposes and effects) as that described in the embodiment. Also, the invention includes configurations in which non-essential parts in the configuration described in the embodiment are replaced. Also, the invention includes configurations that provide the same advantages and effects as those of the configuration described in the embodiment or configurations that can achieve the same purpose as that of described in the embodiment. Further, the invention includes configurations obtained by adding known techniques to the configuration described in the embodiment.

The entire disclosure of Japanese Patent Application No. 2016-024423, filed Feb. 12, 2016 is expressly incorporated by reference herein.

What is claimed is:

1. A radiation curable ink jet composition comprising:
a monomer A that has one of a (meth)acryloyloxy group and a (meth)acryloyl group and has a cyclic structure containing one or more nitrogen atoms and one or more oxygen atoms in addition to the (meth)acryloyloxy group and the (meth)acryloyl group; and
a monofunctional monomer B that has one of a (meth)acryloyloxy group and a (meth)acryloyl group, and has a cyclic structure containing two or more oxygen atoms in addition to the (meth)acryloyloxy group and the (meth)acryloyl group;
wherein the content of the monomer A is equal to or less than 25% by mass with respect to the total mass of the composition, and
wherein a mol average glass transition temperature (Tg) of each of the monomer A and the monofunctional monomer B is equal to or greater than 45° C.

2. The radiation curable ink jet composition according to claim 1, further comprising:
an acylphosphine oxide-based photopolymerization initiator as a polymerization initiator.

3. The radiation curable ink jet composition according to claim 2,
wherein the content of the acylphosphine oxide-based photopolymerization initiator is equal to or greater than 1% by mass and equal to or less than 20% by mass with respect to the total mass of the composition.

4. An ink jet recording method comprising:
irradiating the radiation curable ink jet composition according to claim 3 applied to a recording medium with a UV-LED.

5. An ink jet recording method comprising:
irradiating the radiation curable ink jet composition according to claim 2 applied to a recording medium with a UV-LED.

6. The radiation curable ink jet composition according to claim 1,
wherein the content of the monomer A is equal to or greater than 10% by mass with respect to the total mass of the composition.

7. An ink jet recording method comprising:
irradiating the radiation curable ink jet composition according to claim 6 applied to a recording medium with a UV-LED.

8. The radiation curable ink jet composition according to claim 1,
wherein the content of the monofunctional monomer B is equal to or greater than 45% by mass and equal to or less than 80% by mass with respect to the total mass of the composition.

9. An ink jet recording method comprising:
irradiating the radiation curable ink jet composition according to claim 8 applied to a recording medium with a UV-LED.

10. The radiation curable ink jet composition according to claim 1,
wherein the total content of the polymerizable compound is equal to or greater than 40% by mass and equal to or less than 95% by mass with respect to the total mass of the composition.

11. An ink jet recording method comprising:
irradiating the radiation curable ink jet composition according to claim 10 applied to a recording medium with a UV-LED.

12. The radiation curable ink jet composition according to claim 1,
wherein the monofunctional monomer B is a (meth)acrylate compound.

13. The radiation curable ink jet composition according to claim 1,
wherein a compound represented by the following Formula (1) is contained as the monofunctional monomer B $$CH_2=CR^1-COOR^2-O-CH=CH-R^3 \qquad (1)$$

wherein, in the formula, $R^1$ is a hydrogen atom or a methyl group, $R^2$ is a divalent organic residue containing 2 to 20 carbon atoms, and $R^3$ is a hydrogen atom or a monovalent organic residue containing 1 to 11 carbon atoms.

14. The radiation curable ink jet composition according to claim 13,
wherein the content of the compound represented by Formula (1) is equal to or greater than 1% by mass and equal to or less than 30% by mass with respect to the total mass of the composition.

15. The radiation curable ink jet composition according to claim 1, further comprising:
a coloring material.

16. An ink jet recording method comprising:
irradiating the radiation curable ink jet composition according to claim 1 applied to a recording medium with a UV-LED.

17. The ink jet recording method according to claim 16, wherein irradiation energy of the UV-LED ranges from 50 to 1000 mJ/cm$^2$.

18. The ink jet recording method according to claim 16, wherein irradiation intensity of the UV-LED ranges from 10 to 1000 mW/cm$^2$.

19. The ink jet recording method according to claim 16, wherein the temperature of the recording medium at the time of recording is less than 45° C.

* * * * *